United States Patent
Jain et al.

(10) Patent No.: US 8,175,007 B2
(45) Date of Patent: May 8, 2012

(54) CALL PRIORITY BASED ON AUDIO STREAM ANALYSIS

(75) Inventors: Mukul Jain, San Jose, CA (US);
Labhesh Patel, Sunnyvale, CA (US);
Sanjeev Kumar, San Jose, CA (US);
Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1140 days.

(21) Appl. No.: 11/763,330

(22) Filed: Jun. 14, 2007

(65) Prior Publication Data

US 2008/0310398 A1   Dec. 18, 2008

(51) Int. Cl.
*H04L 12/28* (2006.01)
*H04L 12/66* (2006.01)
(52) U.S. Cl. ...................... 370/255; 370/352
(58) Field of Classification Search .............. 370/254, 370/255, 260, 265, 266, 270, 271, 352
See application file for complete search history.

(56) References Cited

U.S. PATENT DOCUMENTS

| | | | | |
|---|---|---|---|---|
| 5,596,635 A | * | 1/1997 | Rao | 379/202.01 |
| 5,787,162 A | * | 7/1998 | Javitt | 379/229 |
| 5,912,882 A | * | 6/1999 | Yafuso et al. | 370/270 |
| 6,088,444 A | * | 7/2000 | Walker et al. | 379/266.02 |
| 6,147,977 A | * | 11/2000 | Thro et al. | 370/265 |
| 6,768,795 B2 | * | 7/2004 | Feltstrom et al. | 379/391 |
| 6,798,768 B1 | * | 9/2004 | Gallick et al. | 370/352 |
| 7,623,550 B2 | * | 11/2009 | Forbes | 370/477 |
| 2003/0002477 A1 | * | 1/2003 | Israel et al. | 370/352 |
| 2007/0230443 A1 | * | 10/2007 | Milstein et al. | 370/352 |

* cited by examiner

*Primary Examiner* — Hong Cho
(74) *Attorney, Agent, or Firm* — Haynes and Boone, LLP

(57) ABSTRACT

A method and system of prioritizing calls based on audio stream analysis includes receiving a plurality of calls, wherein each call comprises an audio stream. The audio stream associated with one of the calls is analyzed for predetermined audio characteristics. The call is processed based on the audio characteristics of the call. A system for prioritizing calls includes a multipoint control unit for receiving calls. An audio stream capture system captures an audio stream from the calls. The audio stream is analyzed by the capture system according to one or more selected criteria and an urgency priority ranking is determined for each call. The calls are ranked in a queue database according to urgency priority. A controller manages the audio stream capture system, the audio analyzer and queue database computer system.

24 Claims, 5 Drawing Sheets

CALL PRIORITY BASED ON AUDIO STREAM ANALYSIS

TECHNICAL FIELD

The present disclosure relates generally to prioritizing multiple calls.

BACKGROUND

In managing the efficient operation and response of call centers, such as Emergency 911 centers, there is significant value in being able to provide ways to automatically prioritize the incoming call streams by some measure of the severity of the emergency. The audio stream may be the only method of providing information. Therefore, a simple, natural and universally available mechanism, e.g., the content of the call audio stream, would be useful, to prioritize calls in a queue.

Furthermore, conferencing applications may be limited in having the ability to mix only a partial number of incoming audio streams. Thus, conferencing systems may deploy a mechanism to select a few incoming audio streams with highest energy levels, e.g., the loudest speakers. However, this mechanism can provide inaccurate results, for example, if one of the participants is calling from a noisy environment and his audio stream gets mixed for reasons other than being a loud or dominant speaker, such as background noise or voices.

BRIEF DESCRIPTION OF THE DRAWINGS

The present invention will be understood more fully from the detailed description that follows and from the accompanying drawings, which however, should not be taken to limit the invention to the specific embodiments shown, but are only for explanation and understanding.

DESCRIPTION

Overview

Figure 1:
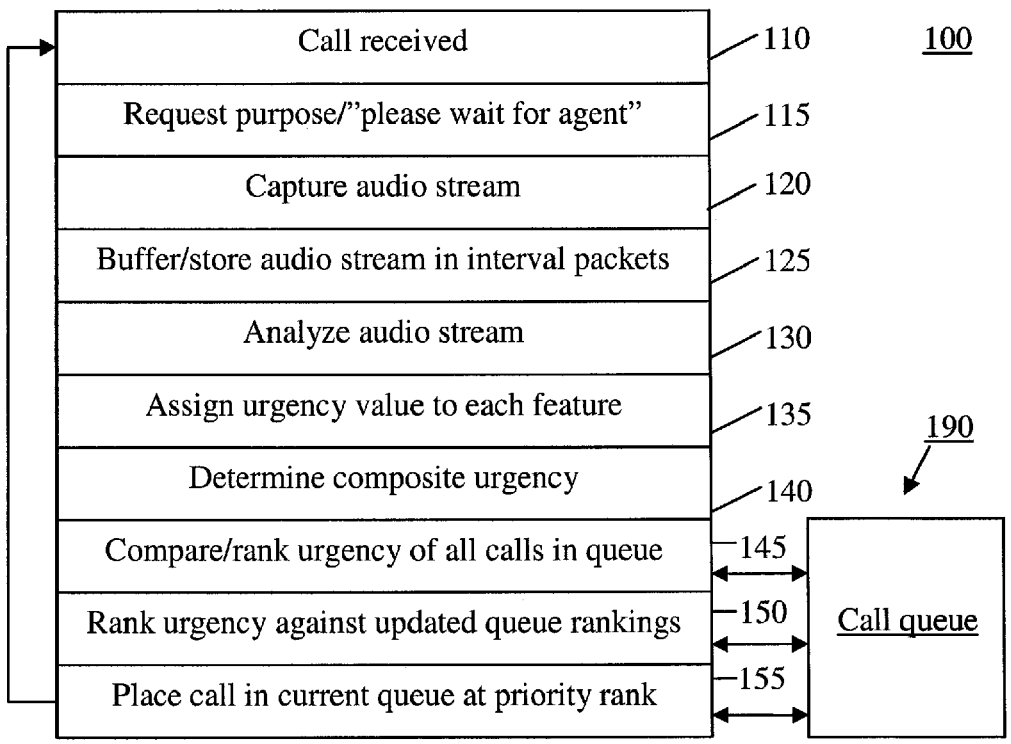
FIG. 1 is a block diagram illustrating an embodiment of a method for call prioritization.

A method of analyzing an audio stream from a telephone call is described to extract properties that permit disposition of the call for various purposes.

In one embodiment, a method of prioritizing calls based on audio stream analysis includes receiving a plurality of calls, wherein each call comprises an audio stream. The audio stream associated with one of the calls is analyzed for predetermined audio characteristics. The call is processed, e.g., prioritized in a queue, based on the audio characteristics of the call.

Description of Example Embodiments

In an Emergency 911 call center, for example, an automated call answering system may analyze the audio waveform for certain features that can assist in assigning priority to the caller based on analysis of the waveform. The audio stream may contain certain words—"Fire", "Help!", "Not Breathing!"—which may be detected with conventional speech recognition algorithms and software. Correlating the recognized words with the spectral frequency ranges and amplitudes in which the words are uttered, for example, may provide additional information for recognizing a degree of anxiety or fear in an excited tone of voice, i.e., based on the pitch and frequency modulation. This additional information is then correlated for elevating or lowering the priority with which call center responders answer incoming calls that are placed in a queue. Certain background sounds comprising special or recognized frequencies patterns—such as sirens, screaming, sharp impulse sounds (e.g., gunshots)—may be correlated to affect the priority, while white noise and non-white-noise low intensity background (e.g., from recognized auto sounds, children at play, or background room conversation, etc.) may be ignored or discounted in terms of assessing call urgency.

In another example, during conference calls, there is often competition among multiple simultaneous call attendees. To optimize the user experience, speaker access may be limited to minimize the amount of extraneous background noise introduced through the mixer. In typical conventional systems, speaker access—or priority—may be selected by the energy content in each audio channel. A practical reason for not mixing all speakers may be due to resource limitations, and furthermore, it is usually unnecessary to mix more than three or four concurrent speakers at a time. Too many concurrent speakers may lead to degradation of the user experience due to overlapping voices and confusion.

A Multipoint Control Unit (MCU) is a device commonly used to bridge audio and/or video conferencing connections. The Multipoint Control Unit is an endpoint on a LAN or other network which provides the capability for three or more terminals and gateways to participate in a multipoint conference.

Current conference system MCUs may generally subtract white noise, which may, for example, arise from electronic sources, establishing a base level above which all contents of an audio stream are analyzed. The current MCU heuristics for selecting which audio streams to be mixed may be typically based on the energy level contained in each stream, where the top three or four streams with the greatest energy levels are picked for mixing. However, current MCUs may not account for the energy component present in the audio stream which is not contributed by the conference participant, i.e., non-voice sound energy.

According to an embodiment of the disclosure, selected properties of the audio stream are analyzed for determining whether to temporarily block output of an audio stream from the mix of incoming audio streams, thus limiting in a selected time interval, who and how many speakers have access rights to be heard. For example, only the top ranked audio streams may be included in the mix heard by call attendees, according to selected criteria. Ranking may be in order of speaker voice power level (e.g., loudness) after subtraction of the sound energy content in non-white background noise, for example, the sound of a siren, auto, crying baby etc. Methods may be employed that can recognize and distinguish between voice and non-voice contributions to the audio stream, and thereby determine the energy content in the voice component of the audio stream. Priority access is then based on each of the meeting participant's voice energy content, e.g., voice loudness.

FIG. 1 is a diagram illustrating an embodiment of a method of a call prioritization 100 for managing calls to a call center in a telephony application. A telephone call is first received (block 110), followed by either responding with a greeting/request or waiting for the caller to make any audible noise, such as voice or sounds (block 115). During the interval following, the entire audio stream, including the caller's response, if any, and any background sounds, is captured (120). The audio stream is buffered or stored (block 125) in selected time intervals (packets) for rapid analysis as well as archived for later off-line analysis. The audio stream is analyzed (block 130) in each time interval according to one or more selected criteria, and an urgency value is assigned (block 135) to the urgency of the feature detected according to each of the selected criteria. In some embodiments, the audio stream is analyzed in real-time, with our without storage or buffering. In other embodiments, the audio stream is stored and analyzed at a later time.

Analyzing may be accomplished using conventional voice recognition algorithms to detect the presence of certain words that carry a connotation of heightened urgency. Additionally, the power and frequency spectrum in the detected words may be correlated with the word content and provide additional criteria upon which to estimate and assign a level of urgency. Further, recognition of other sounds (e.g., sirens, explosions, gunshots) pertinent to urgent situations may also be criteria used to determine urgency. An urgency priority is determined (block 140) representing a composite measure of urgency based on the features analyzed. The urgency ranking of the call is compared (block 145) to that of all calls presently in a queue 190. All calls in queue 190 are continuously analyzed in successive time interval segments to update and re-assign ranking (block 150) if needed. The current call received (block 110) is the placed in queue 190 at its ranked location relative to the other calls in the queue. Thus, a caller's place in the queue may change in relation to the relative urgency of all other calls in the queue from interval to interval, thereby keeping the queue current as to urgency. The procedure may be repeated with each new call as well as periodically with each new interval packet from each caller in the queue, as described above.

Figure 2:
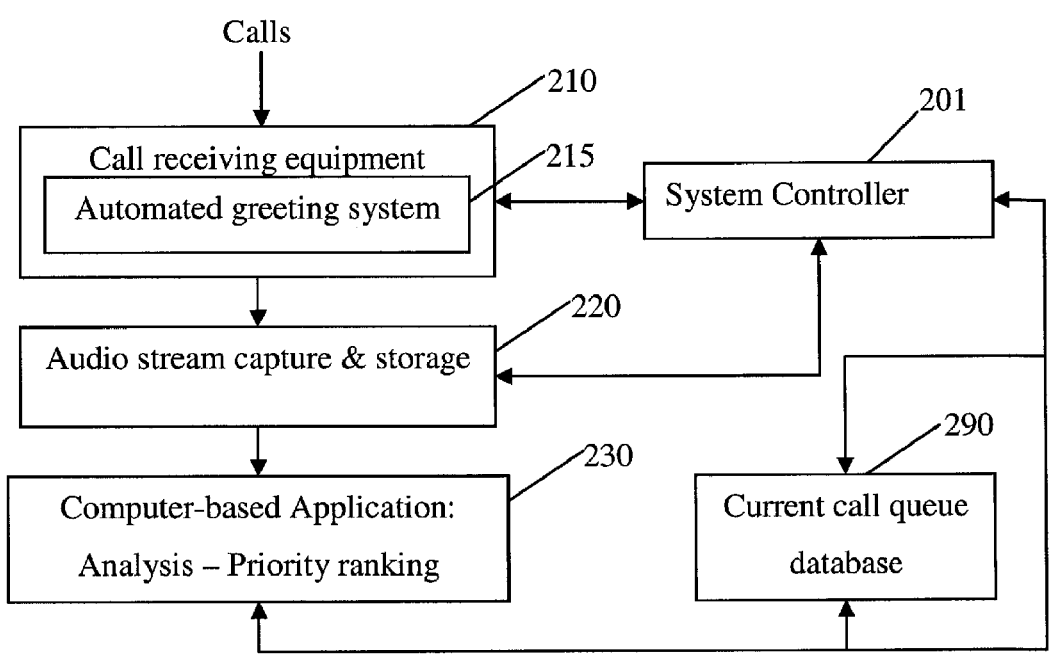
FIG. 2 is a block diagram illustrating an embodiment of a system for call prioritization.

FIG. 2 is a diagram illustrating an embodiment of a system for call prioritization. A call center system 200 for prioritizing calls in a telephony application, where system 200 can hold calls in a queue, includes a call receiving system 210 that may include an automated greeting (and inquiry) system 215 for requesting the purpose of the call. Automated greeting system 215 is indicated as being a subsystem of call receiving system 210, but may also be configured separately while coupled to and acting cooperatively with call receiving system 210. In some embodiments, greeting system 215 is not present, such that analysis is based simply on sounds/voices from a caller when call receiving system 210 answers the call, without prompting of a greeting. Call receiving system 210 is coupled to an audio media stream capture system 220 for storing the audio stream from the caller in intervals (packets) of selected duration for rapid piece-wise analysis, as well as for archival storage for off-line recovery and/or analysis. A computer-based system and software application 230 analyzes audio media stream packets (or other media stream representations) according to selected feature criteria and determines an urgency value for each feature. A composite urgency based on all features is then determined and an urgency rank prioritization is assigned relative to calls currently in a queue 290. Computer-based system 230 is coupled to telephone call receiving system 210 for arranging the calls in a ranked priority order for handling by call center agents. A system controller 201 is coupled to call receiving equipment 210, automated greeting system 215, streaming audio capture system 220, computer-based system 230 and call queue 290 to manage and control the method of receiving, storing, and analyzing calls, assigning priority ranking, and reorganizing the queue as each new call arrives as the content of the streaming audio of each call changes over succeeding packet duration intervals, and as expired calls drop from the queue. System controller 201 may be a server or associated with a server.

Portions of call center system 200 may be incorporated in an Automatic Call Distributor (not shown) for receiving calls, maintaining call queue 290, and holding and distributing calls to agent terminals (not shown). Various arrangements and configurations of elements and functions included, or not included, in the Automatic Call Distributor are possible. An example is provided below.

It may be appreciated that the prioritization process need not be derived from natural language processing methods of artificial intelligence (AI) in the sense that, with AI, a caller's message is being interpreted and understood semantically. Instead, as described, word recognition, based on a library of words associated with urgency, are matched without semantic understanding. Additionally, the prioritization process and system rely as much on the audio content of background non-verbal audio information as on voice properties, which include pitch, volume, rate of speech, and other parameters relating to speech analysis. It is not the semantic message content that is of interest here but, in the example of an Emergency 911 call center, it is the overall degree of "urgency" or "emergency" that is quantified via analysis of the streaming audio signal.

Figure 3:
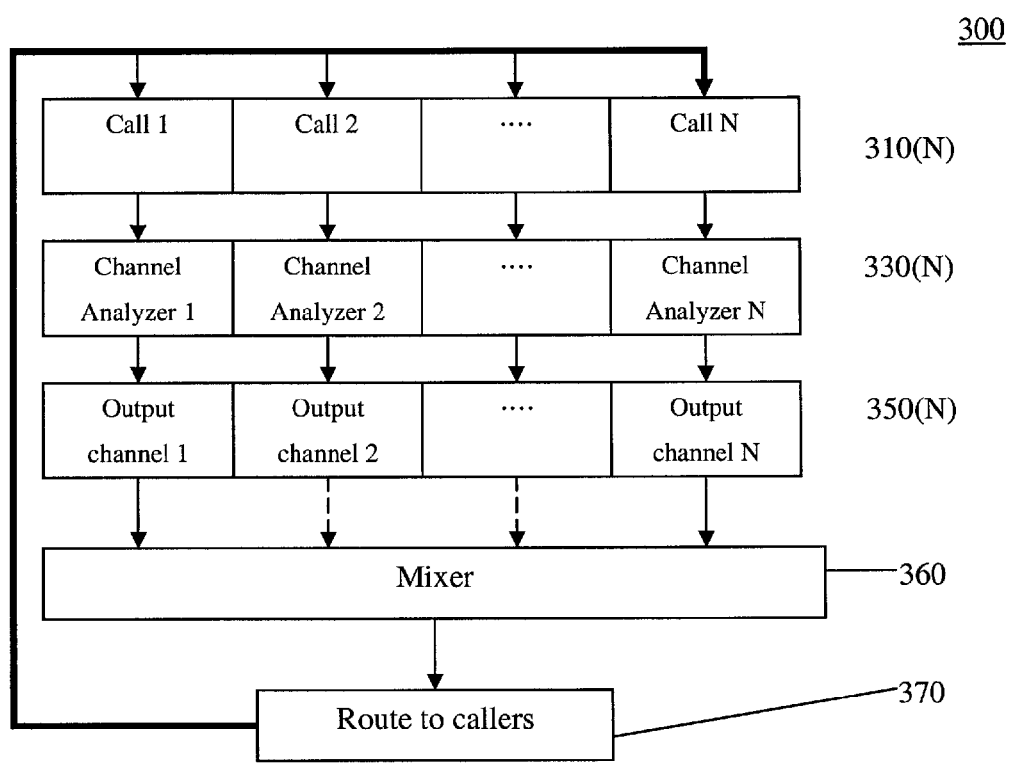
FIG. 3 is a block diagram illustrating an embodiment of a system for controlling the priority of a caller's speech access to a conferencing telephone call.

Referring to FIG. 3, in an embodiment, a method for receiving a plurality of calls in a telephone conference call system 300 includes acquiring an audio stream in packet intervals, e.g., audio packets, of each of N call audio streams 310(N). Each call may be analyzed according to selected feature criteria in N separate audio channel analyzers 330(N). The number of channel analyzers N may be dynamically allocated to the number of calls 310(N) up to the maximum capacity of the installed conference call system 300, and may be a varying number for different conferences or within a single call conference over the duration of the session. Channel analyzers 330(N) may be implemented as hardware. Alternatively, in another deployment topology, channel analyzers 330(N) may be multiple software threads running on a single multithreaded system, including, for example, a server. Thus, in this case, channel analyzer 330 may be implemented as a virtual or conceptual object, in which each packet from each audio stream is analyzed separately. The system may include one or more processors, which may be, for example, a single server or a plurality of processors coupled to a server. For convenience, channel analyzers 330(N) are shown in parallel, however, since multithreading on a single processor is a possible topology implementation, analysis of packets of audio stream from each call channel 310(N) may occur serially, or a combination of serial and parallel analysis of the incoming audio stream packets may occur where some combination of hardware and software implementation permits.

Each of channel analyzers 330(N) may determine the energy content in a speaker's voice apart from other audio energy content in the audio stream. This may be accomplished, for example, using software that recognizes and distinguishes speech from non-speech sounds. Intervals between spoken words, for example, may be used to evaluate the energy content of non-speech sounds. This energy content may be subtracted from the total energy content level of the audio stream packet, determining a net voice audio energy content. Each audio packet may then be ranked by the voice energy content and only a selected number of speakers, e.g., those with the loudest speech energy content, are forwarded to a mixer 360 for broadcast routing 370 to conference call participants. Other streams of audio packets, shown with broken arrows from output channels to mixer 360 are blocked. Alternatively, the blocking function may be performed by channel analyzers 330(N). For example, in one embodiment, in a call conference, a maximum of three speakers (i.e., "top three") may be given access to the mixer, but this is a variable selected by choice. The functions of channel analyzers 330(N) and output channels 350(N) may be combined in an apparatus such as an audio stream analyzer (described below) or may exist as separate structures, and may be a various combination of hardware and software.

A media stream quality ranking is assigned in a manner similar to or substantially the same as in call center system 200 for each of the selected criteria in the audio stream segments, but with different objectives and, therefore, different valuations placed on features that may be analyzed in the audio stream. For example, a speaker on one call channel (i.e., 310(j)) may be functioning with significant distracting background noise. If the nature of the background is significant enough to detract from the conference experience, that jth channel may be blocked until the quality ranking improves. As another example, whereas a detected siren in call channel 310(j) may be a feature elevating the urgency in an Emergency Call Center scenario, it may serve to block call 310(j) from the audio mix—an opposite result. A composite quality ranking may be determined for each audio media stream corresponding to a channel. A specified number of channels, either an absolute number or, alternatively, those meeting a satisfactory threshold requirement for the quality ranking of their corresponding audio media streams, as described above, are selected by output controllers 350(N), which are then passed to mixer 360, where they are mixed to a single audio stream. Either channel analyzers 330(N) or output controllers 350(N) may be equipped to block passage of the audio stream from one or more of the N calls according to threshold or other limitation criteria. The remaining channels of calls 310(N) may be referred to as "top speakers." The audio streams of the "top speakers" selected may be mixed for routing to all callers 370. This routing may take place via any number of communications networks.

The process may be repeated for successive audio stream packet intervals for all participating caller channels to update the access priority of each speaker. Thus, as other speakers enter the conversation, the participating voices may change, but the number of speakers with access at any one time is limited to some maximum number.

Figure 4:
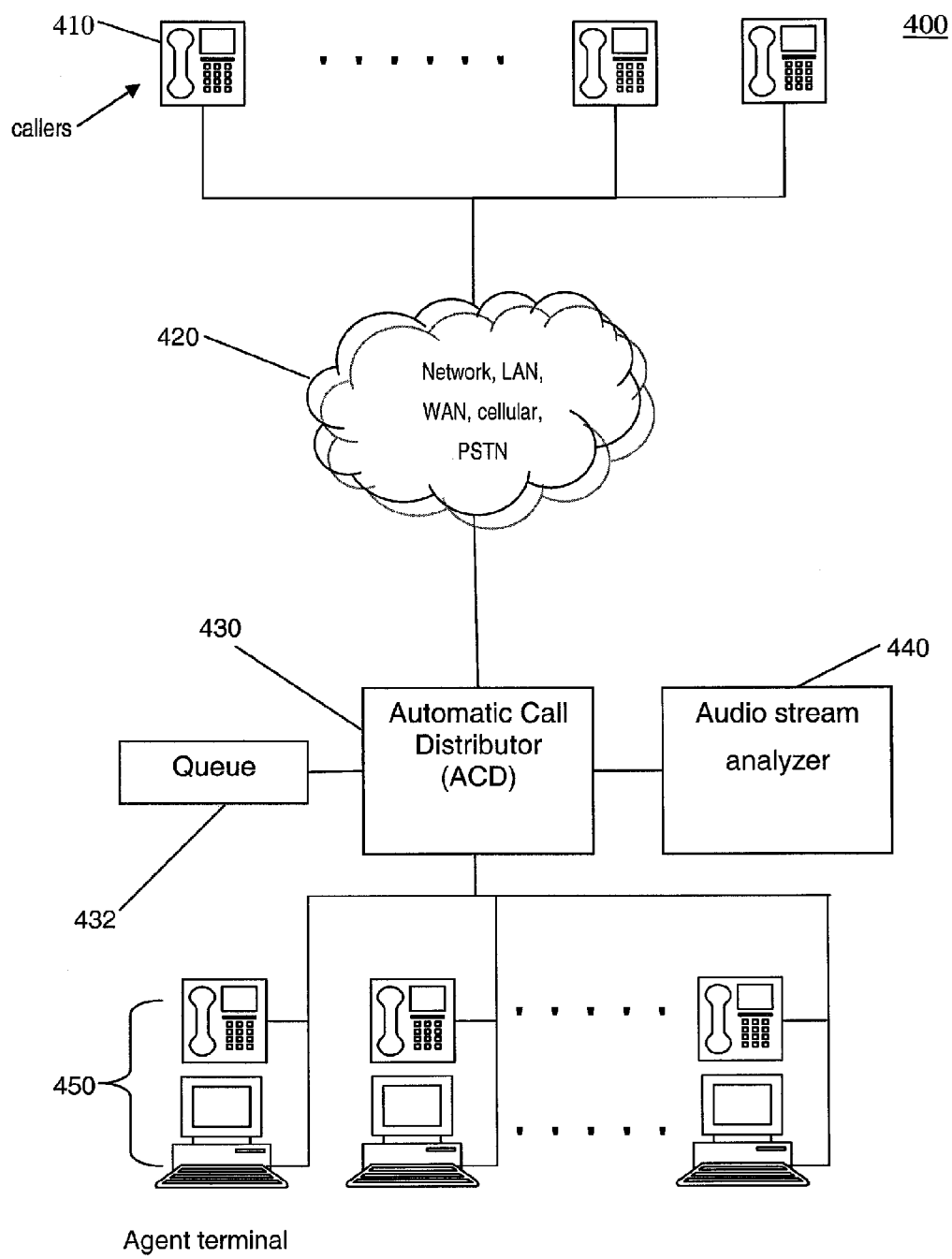
FIG. 4 illustrates an embodiment of a call center for receiving over various networks and prioritizing the calls.

FIG. 4 illustrates an example embodiment of a call center 400 for receiving calls over various networks and prioritizing the calls, in accordance with the disclosure. Callers 410 may communicate with a call center over a network 420 that may comprise any combination of land and wireless connections such as, for example, the Internet, a local area network (LAN), a wide area network (WAN), cellular, or public switched telephone network (PSTN). Calls are received by an Automatic Call Distributor (ACD) 430, which distributes incoming calls to a specific group of terminals 450 that agents use. It is typically part of a computer telephony integration system.

ACDs 430 are often found in offices that handle large volumes of incoming phone calls from callers who have no specific need to talk to a certain person, but want to talk to a person who is ready to serve at the earliest opportunity. Routing incoming calls is the task of ACD 430, which consists of hardware for the terminals and switches, phonelines, and software for the routing strategy. The routing strategy is a rule based set of instructions that tells ACD 430 how calls are handled inside the system. ACD 430 may be coupled to or include a system controller (201 in FIG. 2) for internal control of ACD 430 as well as interactions with other elements of the call center. In accordance with one example of the disclosure, ACD 430 may be coupled to a queue 432, in which the calls are prioritized by ACD 430 through interaction with an audio stream analyzer 440. Calls may be ordered in queue 432 according to a relative priority ranking determined by an urgency rating, as discussed above. Calls are then released to available agents as agent terminals 450 become available. As described above, audio stream analyzer 440 may be configured as a plurality of channel analyzers that are implemented as hardware or software, in parallel or serially, or in some combination of both.

Figure 5:
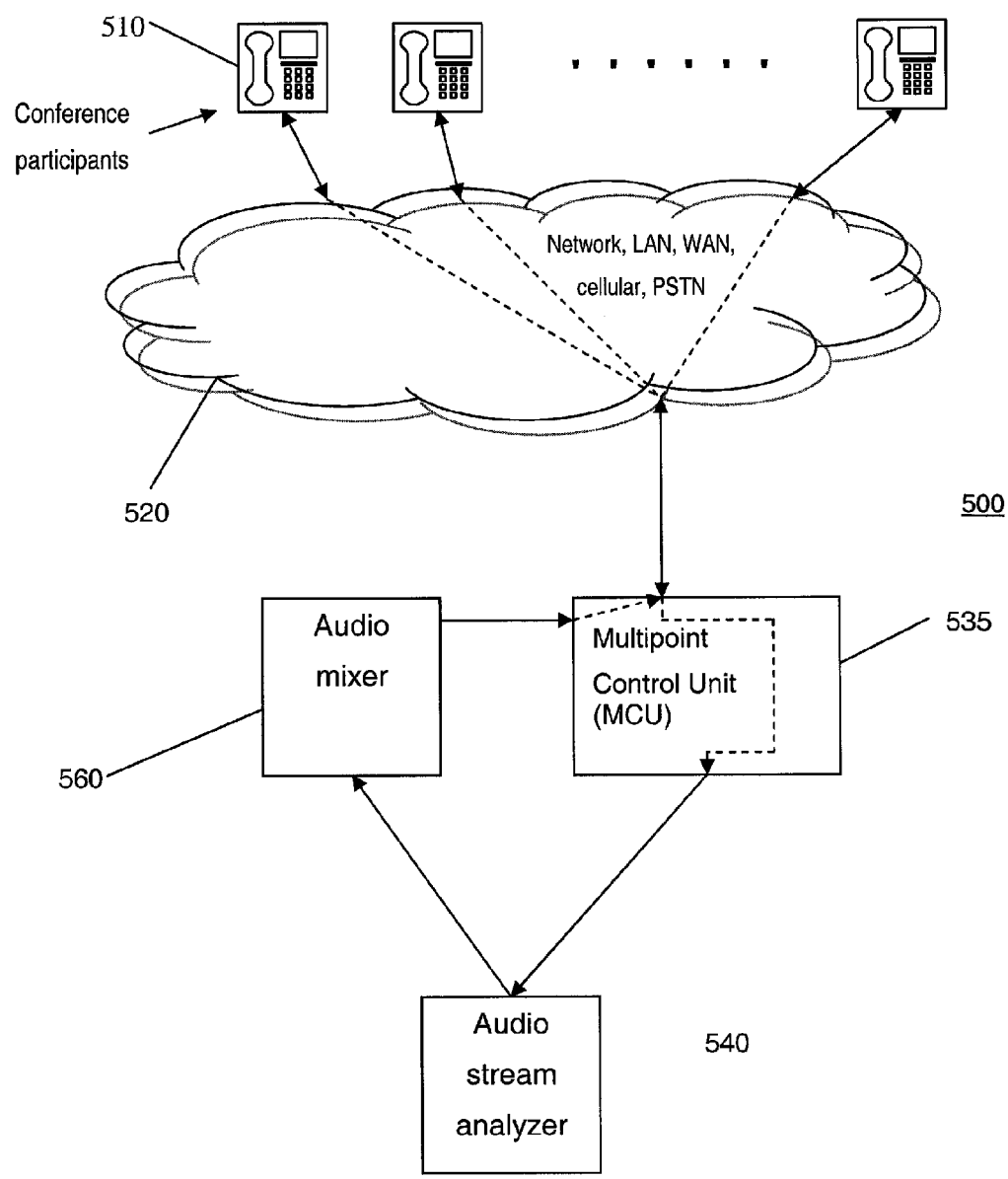
FIG. 5 illustrates an embodiment of a call conferencing system with audio prioritization.

FIG. 5 illustrates a call conferencing system 500 with audio prioritization in accordance with an embodiment of the disclosure. Conference participants use communication devices 510 to communicate over a network 520 that may comprise any combination of land and wireless connections such as, for example, the Internet, a local area network (LAN), a wide area network (WAN), cellular, or public switched telephone network (PSTN). Calls are typically transmitted through network 520 to a call management center (not shown), which includes a multipoint control unit (MCU) 535. MCU 535 may be associated with a server interfaced to network 520. In accordance with one example of the present disclosure, the call management center may also include an audio stream analyzer 540 and an audio mixer 560. In this case, calls received at MCU 535 are routed to and processed by audio stream analyzer 540, as described above with reference to FIG. 3. A selected number of audio streams from specific communication devices 510 (e.g., "top three") may be routed to audio mixer 560, combining the selected streams into a single stream which is then transmitted from MCU 535 over network 520 to all conference participant communication devices 510. Audio stream analyzer 540 may operate to process all incoming audio streams in time segments (i.e., time interval packets) to periodically update the selection of participants to be mixed for broadcast.

In limiting the maximum number of audio streams that may be transmitted to communications devices 510 in conference call system 500, the user experience may be enhanced, e.g., by reduction in the overall background noise that is propagated to all participants.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:
1. A method comprising:
receiving a plurality of calls, wherein each call comprises an audio stream;
analyzing pre-determined audio characteristics in the audio stream associated with at least one of the calls;
ranking the call based on urgency of the call as determined from the audio characteristics of the call;
placing the calls in a queue based on the urgency of each call; and
analyzing the calls in the queue based on the audio characteristics of the calls, including sound content in the calls, in subsequent time intervals to update and reassign rankings if needed, wherein the subsequent time intervals are independent of when a new call is received.

2. The method of claim 1, further comprising responding to the calls in order of urgency.

3. The method of claim 1, wherein the pre-determined audio characteristics comprise voice spectral content.

4. The method of claim 1, wherein the pre-determined audio characteristics comprise sound energy.

5. The method of claim 1, wherein the pre-determined audio characteristics comprise background sound spectral content.

6. The method of claim 1, wherein the pre-determined audio characteristics comprise word recognition.

7. The method of claim 1, wherein the pre-determined audio characteristics comprise background sound recognition.

8. The method of claim 1, wherein the pre-determined audio characteristics comprise at least two of voice spectral content, word recognition, background sound spectral content, background sound recognition, and sound energy.

9. The method of claim 1, wherein the ranking comprises:
assigning a value of urgency to a feature detected according to each of the audio characteristics;
determining a composite urgency based on the values of urgency;
comparing the composite urgency to a composite urgency of another audio stream; and
assigning a relative rank order position based on the comparing.

10. The method of claim 1, wherein the analyzing and ranking are performed in real-time.

11. The method of claim 1, further comprising providing an audible response upon receiving the calls.

12. The method of claim 1, wherein the ranking is performed after each call is analyzed and is relative to the calls in the queue.

13. A system comprising:
a multipoint control unit for receiving a plurality of calls;
an audio stream capture system for obtaining an audio stream from the calls;
a software application operational on a computer system adapted for analyzing the audio stream of each call according to one or more selected criteria, determining an urgency priority ranking of each call, placing the calls in a queue based on the urgency priority ranking of each call; and analyzing the calls in the queue based on the audio characteristics of the calls, including sound content in the calls, in subsequent time intervals to update and reassign rankings if needed, wherein the subsequent time intervals are independent of when a new call is received;
a database comprising the queue of calls ordered according to the urgency priority ranking; and
a controller for managing and controlling the calls in the queue.

14. The system of claim 13, wherein the audio stream capture system comprises a memory for holding time interval packets of the audio stream.

15. A method comprising:
receiving a plurality of calls from participants in a telephone conference for a first selected interval of time, wherein each of the calls comprises an audio stream;
analyzing each audio stream according to one or more selected criteria;
assigning a priority rank to each of the audio streams according to the selected criteria;
selecting from among the plurality of calls a selected number of calls with the highest priority ranks;
mixing the selected calls to provide a single mixed signal;
reanalyzing each audio stream based on audio content of the calls in subsequent time intervals to update and reassign priority ranks during the telephone conference, wherein the subsequent time intervals are independent of when a new call is received.

16. The method of claim 15, further comprising repeating the receiving, analyzing, assigning, selecting, and mixing for at least a second interval of time for the plurality of calls.

17. The method of claim 15, further comprising broadcasting the mixed signal to the participants in the telephone conference.

18. The method of claim 15, wherein the analyzing comprises:
measuring a total energy content in the audio stream;
measuring a non-voice energy content in the audio stream; and
subtracting the non-voice energy content from the total energy content in the audio stream to provide a voice energy content for the audio stream.

19. The method of claim 18, wherein the assigning comprises ordering audio streams in order of highest voice energy content.

20. A system comprising:
an audio stream analyzer configured to analyze an audio stream of received calls according to one or more selected criteria and determine a priority ranking of each call coupled to a call center, wherein the audio stream analyzer determines which calls to route to a plurality of communication devices based on the priority ranking of each call and analyzes each call based on audio content of the calls in subsequent time intervals to re-determine and update priority rankings of each call, wherein the subsequent time intervals are independent of when a new call is received.

21. The system of claim 20, wherein the routing is by an automatic call distributor.

22. A system comprising:
a plurality of channel analyzers, each configured to receive a call comprising an audio stream, wherein each channel analyzer is configured to analyze the audio stream during a first time period and assign a priority ranking to the call according to one or more selected criteria and to reanalyze the audio stream based on audio content of the calls during a second time period and re-assign a priority ranking to the call, wherein the second time period is independent of when a new call is received;
a plurality of output controllers coupled to the channel analyzers and configured to select specific ones of the audio streams based on the priority ranking of the calls;
a mixer coupled to the output controllers to provide a single mixed output signal from the selected ones of the audio streams; and
a call router coupled to the mixer for outputting the single mixed audio signal to a plurality of users.

23. The system of claim 22, wherein the criteria comprises at least one of spectral content of the audio stream, background spectral content, background spectral energy, and voice spectral content.

24. The system of claim 23, wherein the mixer selects for output a specified number of audio streams with the highest voice spectral content or energy content.

* * * * *